United States Patent [19]

Savoyard et al.

[11] Patent Number: 6,053,834
[45] Date of Patent: Apr. 25, 2000

[54] DOUBLE ACTING FRICTION BAND FOR GEAR RATIO CONTROL OF PLANETARY GEAR SETS

[75] Inventors: James P. Savoyard, Fairhaven; James R. Klotz, Mt. Clemens, both of Mich.

[73] Assignee: Chrysler Corporation, Auburn Hills, Mich.

[21] Appl. No.: 09/169,216

[22] Filed: Oct. 9, 1998

[51] Int. Cl.[7] .................................................. F16H 48/30
[52] U.S. Cl. ........................................ 475/145; 188/77 W
[58] Field of Search .................................... 475/145, 146, 475/143; 188/77 R, 77 W

[56] References Cited

U.S. PATENT DOCUMENTS

| | | | |
|---|---|---|---|
| 2,701,630 | 2/1955 | Horton et al. | 188/77 R |
| 2,703,155 | 3/1955 | Simpson | 188/77 R |
| 2,901,888 | 9/1959 | Swift | 188/77 R |
| 3,103,991 | 9/1963 | Flinn | 188/77 R |
| 3,386,535 | 6/1968 | Bishop et al. | |
| 3,756,354 | 9/1973 | Clark | 188/77 R |
| 4,892,360 | 1/1990 | Tysver | 188/77 R |
| 4,915,204 | 4/1990 | Klotz et al. | |
| 5,445,246 | 8/1995 | Haka et al. | 188/77 R |
| 5,711,403 | 1/1998 | Sparks et al. | |

FOREIGN PATENT DOCUMENTS

| | | | |
|---|---|---|---|
| 173471 | 7/1990 | Japan | 188/77 R |
| 26532 | 2/1994 | Japan | 188/77 R |

Primary Examiner—Charles A Marmor
Assistant Examiner—Ha Ho
Attorney, Agent, or Firm—Kenneth H. Maclean

[57] ABSTRACT

An automatic transmission has a planetary gear set with a ratio controlling rotatable reaction element capable of either clockwise or counterclockwise rotation in accordance with different inputs to the gear set and resultant reactive torque loads applied thereto. A circular double acting brake band is used to selectively hold the reaction element stationary when desired and has opposite end portions that alternately serve as control application inputs or a grounding function. In one operative mode, a first end portion of the band receives an apply control force causing the second end portion to be grounded so that the band frictionally secures the reaction element from rotation in a first rotary direction and to thereby enable a first gear ratio. In another operative mode, the second end portion of the band receives an apply control force in direction opposite to the other apply force to cause the first end portion to be grounded so that the band frictionally secures the reaction element from rotation in a second rotary direction opposite the first rotary direction and to thereby enable a second gear ratio. With the brake band selectively activated from either end portion and anchored at the other end portion, the band is wrappingly energization about the reaction element in accordance with the direction of reaction torque thereon. The activation of the brake band is preferably by a hydraulic piston-operated band-locking lever with a pair of arm portions for selectively apply a force to either of the opposite end portions of the brake band.

2 Claims, 3 Drawing Sheets

DOUBLE ACTING FRICTION BAND FOR GEAR RATIO CONTROL OF PLANETARY GEAR SETS

BACKGROUND OF THE INVENTION

1. Field of the Invention

This invention relates to control of planetary gearing for changing the speed and torque ratios thereof and more particularly to a new and improved double acting brake band and controls to improve operation of the band in changing gear ratios in which torque reversals are imparted to the reaction or control member of the planetary gear set.

2. Description of Related Art

Prior to the present invention various arrangements have been devised and disclosed to control the flow of power through gearing in automotive and other power transmissions. In U.S. Pat. No. 4,915,204 issued Apr. 10, 1990 to J. R. Klotz et al for Push/Pull Clutch Apply Piston Of An Automatic Transmission assigned to the assignee of this invention and hereby incorporated reference, a clutch apply piston with a single pressure plate is pushed in one direction for applying a first clutch assembly and pulled in an opposite direction for applying a second clutch assembly for establishing different ratios in an automotive power transmission. In U.S. Pat. No. 5,711,403 issued Jan. 27, 1998 to Sparks et al for a Rapid Apply Servo for a Brake Band of an Automatic Transmission, a hydraulically actuated piston is employed to operate a special brake band to frictionally engage and release a drum operatively connected to a control member of a planetary gear set to effect a ratio change.

While these prior art disclosures have various constructions for controlling the gearing of planetary transmissions and establishing ratio changes they do not disclose or suggest a double acting friction band with improved engagement and control of a reaction member of a planetary gear set subject to torque reversals when different ratios are selected as set forth in the present invention.

SUMMARY OF THE INVENTION

In contrast to the prior art mechanisms, the present invention is drawn to a new and improved double-acting brake band and controls for establishing gear ratio changes in planetary transmissions. In this invention, there is an automatic change speed transmission with planetary gearing having a rotatable reaction or control element that experiences reactive torque loads applied thereto in opposite directions in response to selection of different ratios. An activation system is provided for controlling the apply and release of circular brake band relative to the reaction element to be held. More particularly, the brake band has spaced and facing end portions or tangs on opposite ends of the band relatively movable towards one another on application of the brake band to hold the reaction element from rotation and away from one another when it is desired to release the reaction element. A pivotally mounted band locking lever is provided with two spaced arms, positioned so that a first arm selectively engages a first tang of the band for energizing the band for wrapping on the control element in one rotary direction while the second arm clears the other tang of the band allowing it to ground to hold the reaction element to establish a first ratio. A second ratio is established with different inputs to the planetary gearing with the second arm engaging the second tang for energizing the band for wrapping on the reaction element in an opposite rotary direction while the first arm clears the first tang allowing it to ground to establish the second ratio. A piston is provided for selectively pivoting the band locking lever so as to selectively apply and release the tangs.

These and other features objects and advantages will become more apparent from the following detailed description and drawings.

DESCRIPTION OF THE PREFERRED EMBODIMENT

Figure 1:
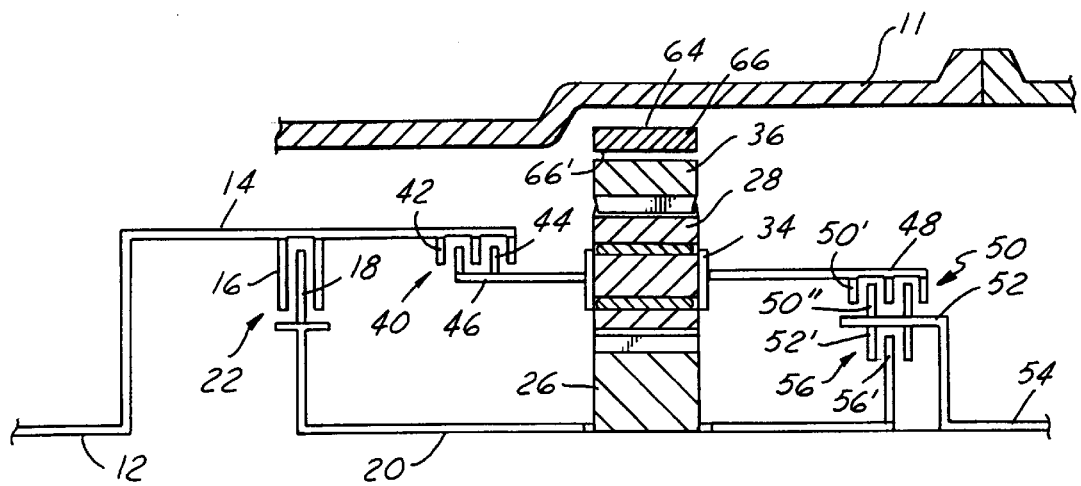
FIG. 1 is a diagrammatic view of an upper portion of a power transmission for an automobile.

Turning now in greater detail to the drawings, FIG. 1 diagrammatically illustrates a portion of a power transmission 10 operatively mounted in a casing 11 having a rotatably driven input shaft 12 driving a drum-like member 14 which houses a first set of friction plates 16 splined thereto interleaved with friction plates 18 carried by an intermediate shaft 20 to provide a first friction clutch assembly 22. Clutch 22, as well as the other clutches described below, are selectively engagable by an associated control not shown to effect the rotational drive of associated elements. For example, an activation of clutch assembly 22 connects input shaft 12 to the intermediate shaft 20. This directly drives a sun gear 26 which is attached to intermediate shaft 20.

In the embodiment shown in the drawings, a planetary gear set consists of three planetary gears 28 which mesh with the sun gear 26. The planetary gears 28 are mounted for rotation on an annular carrier member 32 which also is rotatable about the axis of the sun gear's intermediate shaft 20. The carrier member 32 is perhaps best shown in FIGS. 3 and 4 and has a generally cylindrical configuration. The carrier's planetary gears 28 have external teeth which mesh with the teeth of the sun gear 26 and also mesh with internal teeth formed in a surrounding annulus or ring gear 36.

In the embodiment shown in FIG. 1, the carrier member 32 can be selectively connected to input shaft 12 by the activation of a second friction clutch assembly 40. Clutch 40 includes a first set of friction plates 42 splined to the internal wall of the drum member 14 and friction plates 44 splined to an input portion 46 of the carrier 32. In addition to clutch assembly 40, the carrier 32 is also associated with a third clutch assembly 50. Clutch assembly 50 includes a set of friction plates 50' which are splined to the internal wall of an output portion 48 of the carrier 32 and a set of friction plates 50" splined to a portion 52 of an output shaft 54. By activation of clutch 50, the carrier member 32 is connected to output shaft 54. When clutch assemblies 40 and 50 are activated, power flows from input shaft 12 to the carrier 34 and then flows to the output shaft 54. A fourth clutch assembly 56 is also associated with the portion 52 of the output shaft 54 and has at least one friction plate 56' connected to the intermediate shaft 20 and friction plates 52' connected to the portion 52 of the output shaft 54. By selective activation of the clutch assembly 56 (and clutch 22), a direct drive from the input shaft 14 flows to the intermediate shaft 20 to the output shaft 54.

In the subject embodiment, the annulus or ring gear 36 has a radially outer annular friction surface 64 adapted to be engaged by the inner surface 66' of a circular brake band member 66. When frictionally applied the ring gear 36, the brake band member 66 holds the ring gear stationary in a reaction mode. This conditions the planetary gear set for effecting a drive gear ratio by means of the sun gear 26 and planetary gears 28.

Figure 2:
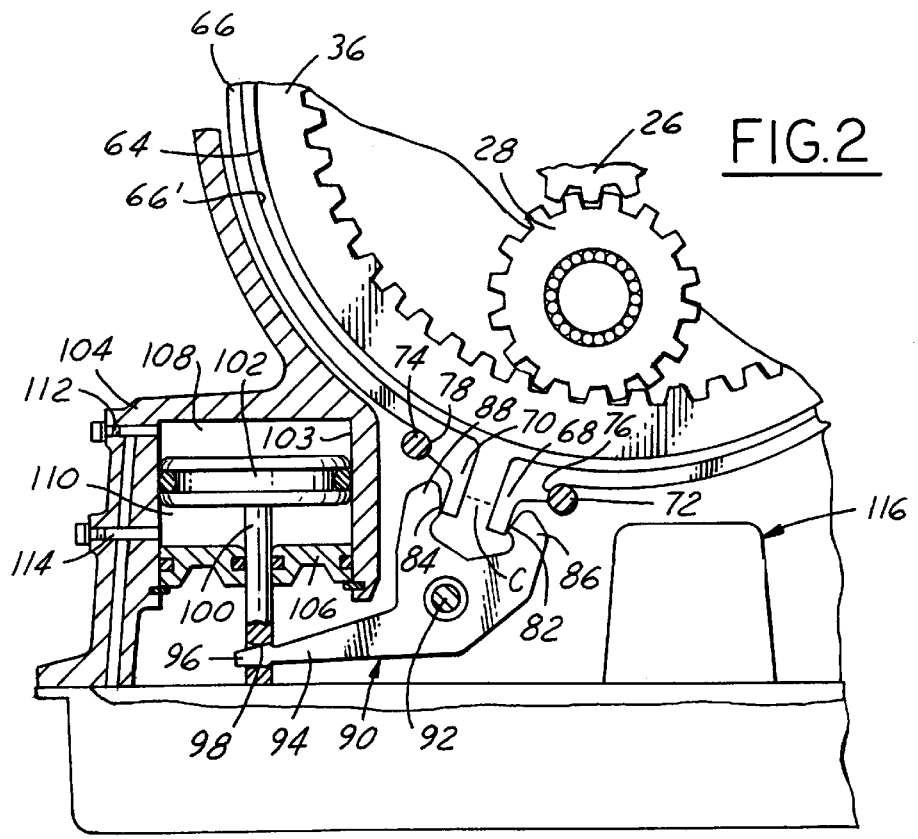
FIG. 2 is a cross sectional view of a portion of a planetary gear set of the transmission diagrammatically shown in FIG. 1 and conditioned for a neutral operative arrangement.
Figure 3:
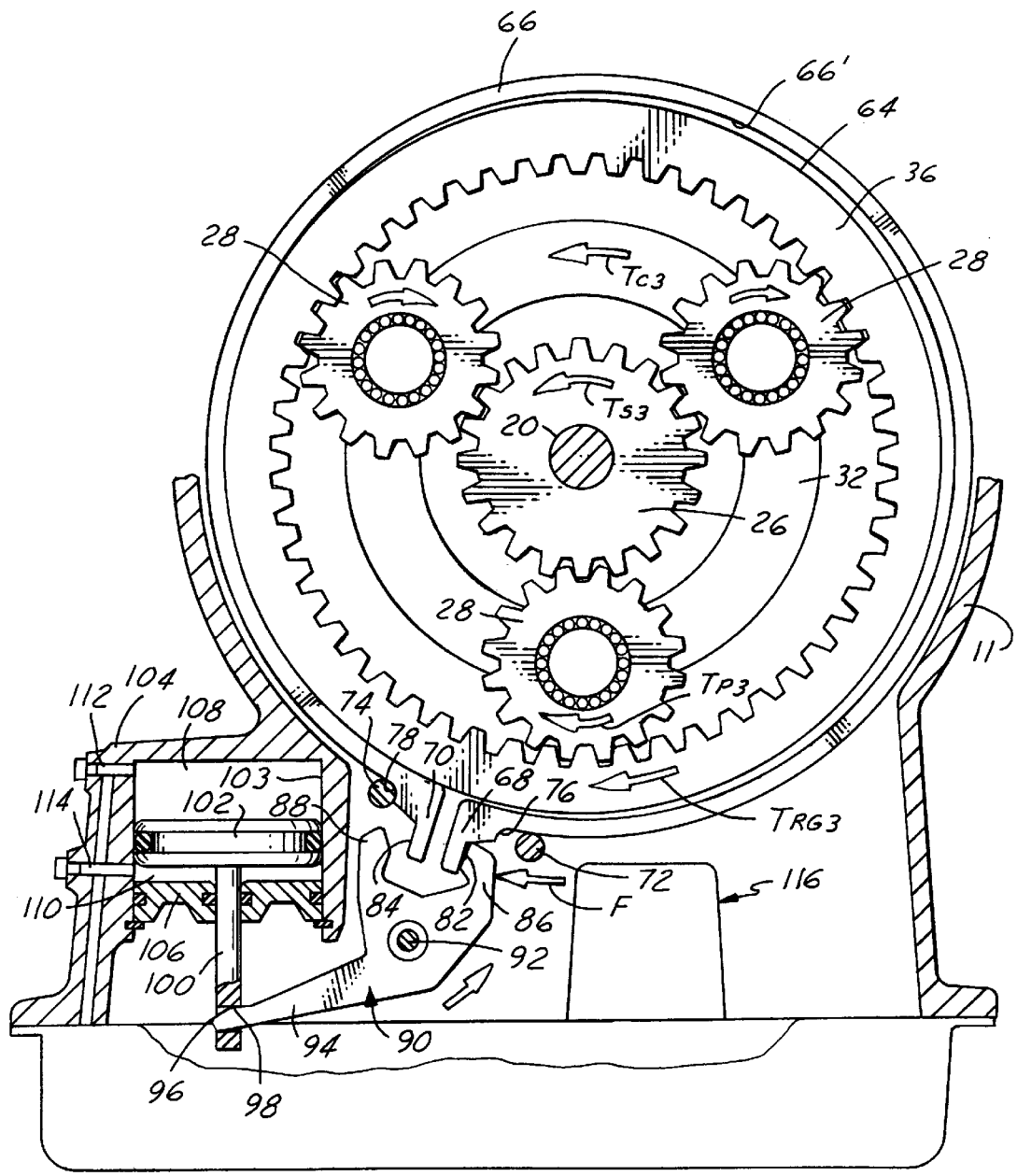
FIG. 3 is a view similar to the view of FIG. 2 showing the planetary gear set conditioned for one gear ratio.
Figure 4:
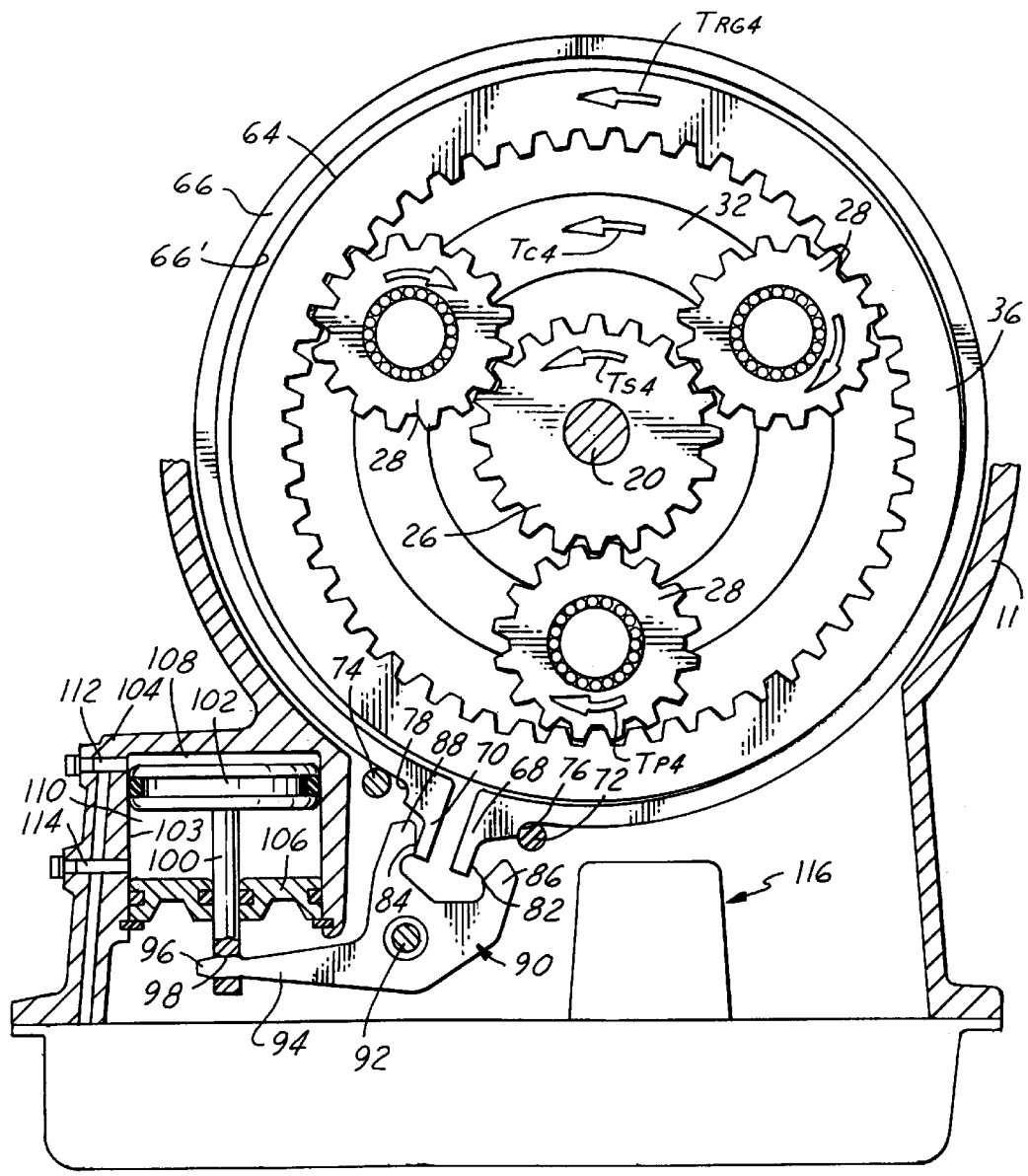
FIG. 4 is view similar to the views of FIGS. 2 and 3 showing the planetary gear set conditioned for another gear ration.

As shown in the FIGS. 2–4, the brake band 66 substantially encircles the outer periphery of the annulus or ring gear 36. The brake band 66 has a pair of radially projecting terminal ends or tangs 68, 70 spaced from one another by a small clearance "c" which is produced at the interface therebetween when the band is in an inactive or neutral mode of operation as is illustrated in FIG. 2. The tangs 68, 70 are located between a pair of spaced anchor pins 72, 74 which are supported or grounded to the transmission casing or housing 11. The circular brake band 66 is resilient, with its main body being of a suitable steel and having the interior face lined with or carrying a friction material to produce a friction surface 66'. In the neutral mode shown in FIG. 2, the natural expansive resiliency of the brake band 66 causes the friction surface 66' to be spaced away from the annulus or ring gear's friction surface 64. In the neutral or inactive operative condition or mode illustrated in FIG. 2, the brake band 66 is generally not engaged with the surface 64 of the ring gear and therefore no power can flow through the planetary gear set.

A pair of stop shoulders 76, 78 of tangs 68, 70 are adapted to alternately engage one of a pair of anchor pins 72, 74 whenever it is desirable to utilize the brake band 66 to prevent rotation of the annulus or ring gear 36. Specifically, the tangs 68 and 70 have outward facing contact surfaces 82, 84 thereon adapted to be engaged by arm portions 86, 88 of a control structure in the form of a double acting pivotal lever 90. When the lever 90 is pivoted in one direction, one of the arms engages one of the contact surfaces of the tangs causing an end portion of the band brake 66 to move. When the lever 90 is pivoted in an opposite direction, the other arm engages the other contact surface causing the other end portion of the band brake 66 to move. Specifically, the lever 90 is mounted on a pivot pin 92 which is secured to the transmission case or housing 11.

As shown in FIGS. 2–4, the lever 90 also has an extended lever arm 94 which projects from its main body and terminating with a connector end portion 96. The end portion 96 operatively fits into a slot 98 formed in an end portion fo an elongated piston rod 100. The piston rod 100 is attached to a piston member 102 which is mounted in a cylinder bore 103 formed in a housing 104 which can be formed as part of the transmission casing 11. The piston 102 can move reciprocally in the bore 103 in response to pressure forces exerted against its upper or lower faces. The midportion of the piston rod 100 extends through a retainer member 106 which seals against the rod and defines a lower end portion of the housing. With the retainer 106, the piston 102 separates the chamber formed by the bore 103 and retainer 106 into upper and lower pressure chambers 108 and 110. Pressure chambers 108 and 110 are selectively connected to a source of pressurized hydraulic fluid through a suitable hydraulic control mechanism 116 shown diagrammatically in the drawings. The control 116 transmits pressurized hydraulic fluid through passages 112 or 114 to the upper and lower chambers 108 and 110.

For one mode of operation or range of gear selection, the clutch assemblies 22 and 56 are selectively activated to provide input from shaft 12 directly to the intermediate shaft 20 and sun gear 26 thereon. The power flows from intermediate shaft 20 to the output shaft 54. The clutch assemblies 40 and 50 are not activated in this mode. There is not reduction produced by the planetary gear set in this mode of operation and no need to restrain the rotation of the ring gear 36.

Another range of gear selection for operation of the vehicle is shown in FIG. 3. In this mode, clutch assembly 22 shown in FIG. 1 is selectively activated to provide input from input shaft 12 directly to the intermediate shaft 20 and the sun gear 26 thereon. Specifically, the sun gear 26 is rotated counterclockwise by power applied through clutch 22 and applies a torque labeled $T_{S3}$ to the planetary gears 28 as shown. This produces clockwise rotation of the planetary gears 28 and transmits a torque therethrough labeled $T_{P3}$ as shown. When in this mode of operation, the annulus or ring gear 36 is prevented from rotation as explained hereafter. By rotating the planetary gears 28 and holding the annuluss or ring gear stationary, counterclockwise rotation of the carrier member 32 is produced and is accompanied by a transmission of torque to the carrier labeled $T_{C3}$. This carrier torque is then transmitted through activated clutch assembly 50 to the output shaft 54.

The transmission is conditioned for the reduction drive through the planetary gear set by securing the annulus or ring gear 36 from counterclockwise rotation which would normally be caused by the action of the gears 28 thereon by a torque transmission labeled $T_{RG3}$ in FIG. 3. This reaction mode in which rotation of the annulus or ring gear 36 is prevented is produced by engagement of the brake band 66 with the annulus or ring gear 36 accomplished by an application of a force labeled F on tang 68 by arm 86. The arm 86 is moved to the left in FIG. 3 by counterclockwise pivoting of member 90 produced by movement of piston 102 and piston rod 100 downward selectively caused by supplying pressurized hydraulic fluid to upper chamber 108. The pivotal movement of member 90 causes its arm 86 to engage the contact surface 82 of the tang 68 which moves tang 68 toward the other tang 70, thus reducing the clearance space "c" and tightening the band 66 around the annulus or ring gear 36. Simultaneously, the surface 78 of tang 70 engages the stationary pin 74 and anchors brake band 66 from clockwise rotation. This effectively holds the annulus or ring gear 36 in a stationary and non-rotative position.

FIG. 3 illustrates the band 66 after its friction surface 66' has engaged the ring gear's friction surface 64 after engagement of tang's surface 78 with the stationary pin 74. The clearance space "c" has been greatly decreased as the band "self energizes" to secure the annulus or ring gear fully wrapped about annulus 36 during the reaction mode. Under these conditions, the output of the gear set is through carrier 32. With clutch assembly 50 engaged, the power is transmitted to output shaft 54 at a reduction drive ratio established by the planetary gear set.

In FIG. 4, another range of gear selection for vehicle operation is shown. In this operational mode, the clutch assemblies 22 and 50 are deactivated and clutch assemblies 40 and 56 are activated to route power from the input shaft 12 directly to the carrier 32 and thus to the planetary gears 28, defining a carrier input mode. This generates a counterclockwise rotation of the carrier 32 as caused by a torque input $T_{C4}$ as shown in FIG. 4. When the annulus or ring gear 36 is held stationary under these conditions as will be explained hereinafter, the powered planetary gears 28 are rotated clockwise as the carrier rotates. The rotation of the planetary gears 28 produces a counterclockwise rotation of the sun gear 26 and transmits the torque labeled $Ts_4$ thereto as shown in FIG. 4. This torque $T_{S4}$ is transmitted through intermediate shaft 20 and through clutch 56 to the output shaft 54.

In the operative mode shown in FIG. 4, the transmission is conditioned for a reaction drive through the planetary gear set by securing the annulus or ring gear 36 from counterclockwise rotation which would normally be produced by torque input $T_{C4}$ to the carrier 32. Resultantly, the carrier 32 rotates counterclockwise and its planetary gears rotate clockwise. The resultant torque transmission to the annulus or ring gear 36 is identified by label $T_{RG4}$ in FIG. 4. The activation of the brake band 66 to establish a reaction effect or stabilizing non-rotation of the annulus or ring gear 36, is effected pressurization of the piston chamber 110 which moves the piston 102 upwardly in bore 103. The corresponding downward movement to the piston rod 100 produces a counterclockwise pivoting of the band locking lever 90 and rightward movement of the arm or jaw 88 against the tang 70. This moves the tang 70 toward the other tang 68 thereby diminishing the clearance space "c" and causes the shoulder surface 76 to engage the grounding pin 72. Consequently, the brake band 66 wraps about the ring gear 36 and engages friction surfaces 66' and 64. Under these conditions, the annulus or ring gear 36 is held from rotating while the carrier 32 rotates counterclockwise accompanied by clockwise rotation of the planetary gears 28. Power is transmitted from the carrier 32 to the sun gear 26 resulting in the torque $T_{S4}$ which is transmitted through the intermediate shaft 20, through clutch 56 to the output shaft 54.

A direct drive through the transmission can be effected by activation of clutches 22 and 56 and deactivation of clutches 40 and 50. In this application, the control places the piston's chambers 108 and 110 under an unpressurized state so that the brake band 66 can expand and be disengaged so that the friction surfaces 64 and 66' are disengaged. This allows the annulus or ring gear 36 to rotate.

It will further be appreciated that only a portion of the transmission is shown and that other gear ratios and reverse strategies can be added with additional gear sets and controls not shown. Also, while the reaction producing arrangement in this preferred embodiment is disclosed as being the annulus or ring gear, it will be appreciated that other elements of the planetary gear set can be utilized for torque reaction with appropriate construction connected thereto and friction surfaces provided suitable for use with the brake band or an equivalent.

While the invention has been described in detail to illustrate one preferred construction and operation, it will be understood to one skilled in the art that the invention may be modified without departing from the spirit thereof. Accordingly, various changes of form and arrangements may be made without departing from the spirit and scope of the invention which is defined in the following claims.

We claim:

1. In a transmission including a planetary gear set with rotational input and an output members, a control for selectively engaging and holding a rotatable member of the planetary gear set from rotation in either direction to effect various input/output gear ratios, comprising: the control including a resilient, elongated band member having first and a second tang portions extending from opposite end portions of the band member; said band member extending in a curved path from said first tang to said second tang and carrying a friction face thereon facing the rotatable member; said tangs extending radially outwardly from said band member in spaced relationship to one another and establishing a spaced interfacing relationship therebetween; each tang portion respectively being associated with an adjacent grounding surface adapted for selective engagement with a stationary grounding structure of the transmission; each tang portion having a contact for engagement; a band actuating device including a band locking lever having a pair of laterally spaced arms, one of said arms being associated with only said first tang of said band member and the other of said arms being associated with said second tang; said band locking lever being operatively mounted for limited rotary movement on a pivot; a bi-directional activating unit operatively connected to said band locking lever including a piston which is selectively movable in a cylinder bore for selectively positioning said locking lever whereby in a first mode, the contact of said first tang is engaged by one arm of said band actuating device and moved toward said second tang which engages the grounding surface of said second tang with the stationary grounding structure and causes constriction of said band about the rotatable member so that the resultant frictional engagement prevents rotation of the rotatable member and thus enables one input/output gear ratio; and alternately in a second mode the contact of said second tang is engaged by said other arm of said band actuating device and moved toward said first tang which engages the grounding surface of said first tang with the stationary grounding structure and causes constriction of said band about the rotatable member so that the resultant frictional engagement prevents rotation of the rotatable member and thus enables another input/output gear ratio to effect operational modes of said band member wherein differing gear ratio outputs are produced from said planetary gear set.

2. The transmission control as set forth in claim 1 in which the planetary gear set defines an annulus which serves as said rotatable member and said brake member is adapted to substantially encircle the annulus wherein when the rotative direction of the annulus is reversed thereby reversing the reactive torque thereon, said band member tends to engage the annulus in a wrapping engagement thereabout to hold the annulus against any reactive torque thereon associated with the direction of torque.

* * * * *